Dec. 25, 1962 W. K. WHITLOCK 3,069,873
REPLACEABLE WEAR COMPONENTS FOR COTTON SEED PRESS
Filed May 5, 1961
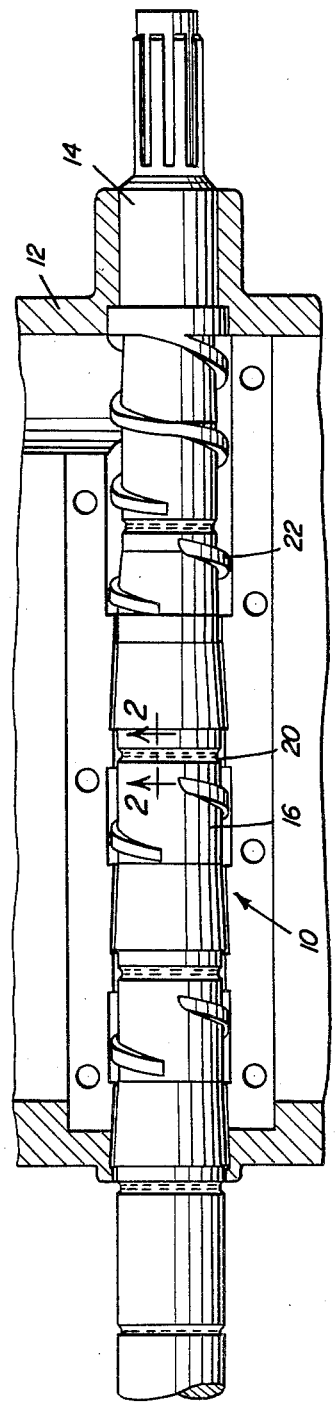
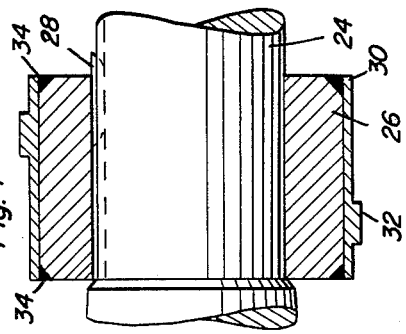
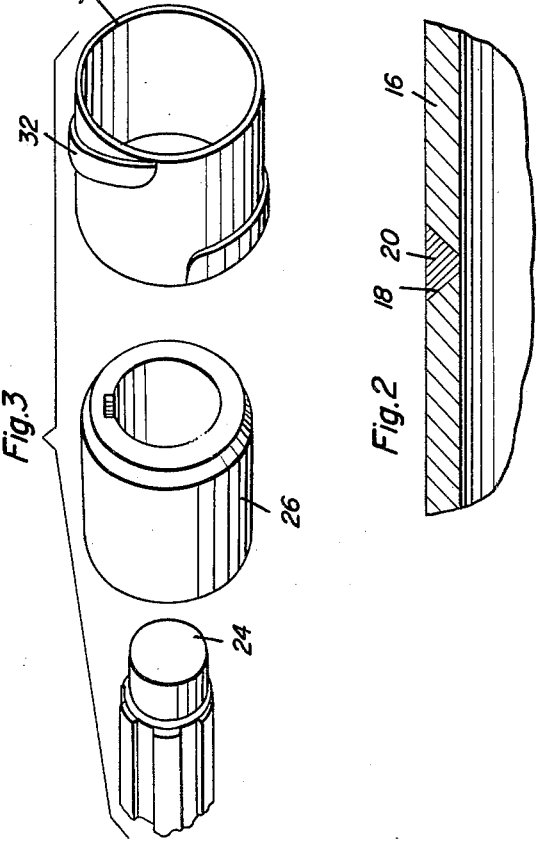
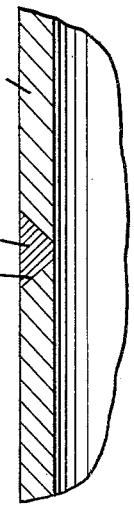
Walter K. Whitlock
INVENTOR.
BY Clarence A. O'Brien
and Harvey B. Jackson
Attorneys

United States Patent Office 3,069,873
Patented Dec. 25, 1962

3,069,873
REPLACEABLE WEAR COMPONENTS FOR COTTON SEED PRESS
Walter K. Whitlock, 1911 N. Lexington Blvd., Corpus Christi, Tex.
Filed May 5, 1961, Ser. No. 108,137
4 Claims. (Cl. 64—1)

The present invention generally relates to improvements in the shaft normally found in cotton seed presses and more particularly relates to a novel manner of manufacturing and repairing the sleeves, collars and hubs which are fitted on the shaft used in a cotton seed press at cotton seed oil mills.

It is well known that the exposed and working surfaces on the shaft in cotton seed presses are subject to considerable wear due to their particular operation upon the cotton seed and due to such wear, the surfaces must be periodically replaced. Normally, the sleeves, collars and hubs have a hard surface applied thereto by molding the hardened metal thereto. When repairing such surfaces after wear, it has been customary to build the hard metal back upon the softer interior metal by welding the hard surface metal thereon. In distinction to this, the present invention has for its primary object the provision of a precast hard metal in the form of a collar which will slip over the hub with the collar then being welded into place by a solid weld at either end of the collar. While this feature is primarily adapted for use in repair of the parts, it is also capable of being used in the original manufacture of the same.

The advantages obtained from the above mentioned procedure as compared with the customary procedure is that the novel process would be less expensive, require a much shorter period of time, the interior soft metal of the pieces could be used for a much longer period of time since they would not have to undergo a welding process, that is, a solid build up type of weld each time they were repaired, the piece or collar could be repaired by merely cutting off at either end of the piece the weld and removing the used collar and applying a new collar thereto and subsequently building up the ends of the interior soft metal by a weld that would then be used to hold the new collar in place.

Another object of the present invention is to provide a precast collar with hard surfaces which may be applied directly to a solid shaft rather than to the hub set forth in the preceding paragraph in which the collars are then welded to each other.

The advantages to be derived from both of the previously mentioned processes is that when the hard surfacing material is precast, the grain structure of the steel in the shaft would not be changed so that a uniform hardness of the shaft would remain. In present day practice, it is necessary that the shaft be heated in order to replace the hard surfacing material onto the shaft and this heating causes a change in the grain structure of the metal from which the shaft is constructed. Thus, by repairing the shaft in this manner, it comes out in the same condition as it was originally manufactured.

The shaft also has no cracks or other irregularities therein in that a better application of the hardened surfaces may be applied by applying the casting thereto. Further, there is no dilution of the base material and the overlying hard surfacing material.

The procedures outlined above may be employed on all types of oil bearing seed press screws which employ the type of screw press disclosed. Further, the concept may be employed in screw press equipment used in rendering plants operated in connection with meat packing plants as well as in oil bearing seed presses. Also, any suitable binding agent such as conventional welding, brazing or the like may be employed for retaining the collars either on the hub or on the shaft depending upon the procedure employed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic plan view illustrating a seed press screw incorporating the features of the present invention therein;

FIGURE 2 is a detailed sectional view taken substantially upon a plane passing along section line 2—2 of FIGURE 1 illustrating the connection between the collars on the shaft;

FIGURE 3 is an exploded group perspective view illustrating the precast collar and the hub to which it is attached; and FIGURE 4 is a detailed sectional view of the assembly of FIGURE 3 illustrating the relationship of the precast collar, hub and shaft.

Referring now specifically to the drawings, the numeral 10 generally designates the seed press screw incorporating the features of the present invention. The screw 10 is normally rotatably supported on suitable casing structure 12 and is received in a housing for purposes of extracting oil from the seed such as extracting cotton oil from cotton seed. The shaft designated by numeral 14 is of conventional construction and is of a softer metal than the spiral members normally mounted thereon. Conventionally, the shaft is provided with built up wear surfaces which are formed by welding such hard metal surfaces on the periphery thereof.

FIGURE 2 illustrates the details of one form of the invention in which a precast collar 16 of hard metal is disposed directly on the shaft and there are a plurality of collars thereon in which the ends of the collars 16 are inclined as at 18 and the collars 16 are rigidly connected together by welding 20, brazing or by any other binding agent. Thus, when it is desired to replace one of the collars 16, it is only necessary to rupture the weld 20 thus removing the collar 16 and subsequently replacing the collar 16 with a similar new collar. Of course, each collar 16 is provided with a spiral projection 22 thereon which is cast therewith and which is of hard metal and which actually receives the majority of the wearing forces.

In the form of the invention illustrated in FIGURES 3 and 4, the shaft 24 is provided with a cylindrical hub 26 thereon which may be keyed thereto by a Woodruff key 28 or any other suitable means. Mounted on the hub 26 is a precast cylindrical collar 30 having a spiral projection 32 thereon in which the collar and projection are constructed of hard metal and the collar 30 is placed on the hub 26 by merely sliding the collar 30 over the hub 26 after which the ends of the collar 30 are continuously secured to the ends of the hub 26 by virtue of peripheral welding 34, brazing or by employing any suitable bonding agent. Of course, the hub and collar both may taper as required for proper operation of the press screw 10.

Briefly, there is disclosed two basic types of application of hard surfacing material to the shaft. In FIGURES 3 and 4, the hard metal castings or collars 30 are welded directly to the steel hubs 26 which in turn would be placed on a shaft and held thereon by a key assembly or any other suitable securing means. Also, brazing or other binding agents may be employed for holding the collar 30 in place. Normally, there are approximately thirteen collars thereon, some of which have spiral projections of various lengths and the collars are also of various lengths but in each instance, the hard metal castings or collars are applied in exactly the same manner to the steel hub.

In the form of the invention illustrated in FIGURES 1 and 2, the hard metal castings or collars are applied directly to the solid shaft with the collars being welded to each other as illustrated in FIGURE 2. Also, brazing or any other suitable binding agents may be employed for holding the collars together. Here again, a plurality of collars are employed some of which have spiral screw-like projections on the exterior surface thereof of various lengths and also the collars may be of various lengths and arrangement and also, there would normally be approximately thirteen collars on the shaft.

In each form of the invention, certain advantages occur. For example, by precasting the hard surfacing material, the grain structure of the hard surfacing material is of such nature that it is more wear resistant than if the same hard surfacing material were applied in a built up welding procedure which has been conventionally employed heretofore. Further, by using a precast hard surfacing material, all possibility of dilution of the hard surfacing material by the softer base metal is eliminated. Whenever the base metal is mixed with the hard surfacing material, the hardness of the hard surfacing material is reduced. Of course, in any built up process, there is more possibility of dilution of the hard surfacing material by the base metal. These procedures also eliminate distortion of the components and also eliminates cracks and porosity in the hard surfacing material. Also, by using the precast hard surfacing material in repairing the wearing surfaces, the shaft would not have to be heated up to and beyond the critical temperature range which would change the grain structure thereby eliminating any chance of changing the grain structure of the shaft itself thereby eliminating damage to the shaft from a strength standpoint. The above procedures also materially reduce the time required in repairing the wear surfaces. Normally, such surfaces are built up on the shaft by a conventional build up or welding procedure and the hard surfacing material is built up past the requisite size and then machined back down to the desired size all of which requires considerable time and also wastes considerable hard surfacing material. Besides wasting the material and consuming time, there is considerable chance for inaccuracy in the machining process which also is automatically overcome by having the hard surfacing material precast into collars which may be mounted directly on the shaft or attached to a hub that is keyed to the shaft or otherwise secured to the shaft.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a cotton seed press screw having a shaft, a plurality of annular collars of hard metal for mounting on the shaft and providing hardened wear surfaces, and means rigidly securing the annular collars in assembled relation in encircling relation to the shaft without requiring a deformation of the shaft or the heating of the shaft beyond a temperature which would adversely affect its grain structure, said means for retaining the annular collars in assembled relation including a binding agent securing the ends of the collars together, in assembled relation on the shaft, said binding agent being in the form of welding, brazing or the like, said collars having inclined end edge surfaces forming grooves for receiving the binding agent.

2. In a cotton seed press screw having a shaft, a plurality of collars of hard metal for mounting on the shaft and providing hardened wear surfaces, and means rigidly securing the collars in assembled relation in encircling relation to the shaft without requiring the heating of the shaft beyond a temperature which would adversely affect its grain structure, said means retaining the collars on the shaft includes a hub for each collar, said hub closely receiving the interior surface of the collar, means rigidly affixing the hub to the shaft, and a binding agent, such as welding, brazing or the like, connecting the collar to the hub.

3. The structure as defined in claim 2 wherein said binding agent is disposed peripherally of the collar at each end thereof.

4. In a built up shaft, a plurality of collars for mounting on the shaft, a hub for each collar, said hub closely receiving the interior surface of the collar, means rigidly affixing the hub to the shaft, and a binding agent connecting the collar to the hub.

References Cited in the file of this patent

UNITED STATES PATENTS

| | | |
|---|---|---|
| 665,262 | Peck | Jan. 1, 1901 |
| 1,690,684 | Johnson | Nov. 6, 1928 |
| 1,884,104 | Moore et al. | Oct. 25, 1932 |
| 2,219,085 | Watson | Oct. 22, 1940 |
| 2,262,210 | Store | Nov. 11, 1941 |